United States Patent
Islam et al.

(10) Patent No.: US 10,019,569 B2
(45) Date of Patent: Jul. 10, 2018

(54) DYNAMIC PATCHING FOR DIVERSITY-BASED SOFTWARE SECURITY

(71) Applicant: QUALCOMM Incorporated, San Diego, CA (US)

(72) Inventors: Nayeem Islam, Palo Alto, CA (US); Rajarshi Gupta, Sunnyvalle, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 14/316,961

(22) Filed: Jun. 27, 2014

(65) Prior Publication Data
US 2015/0379262 A1    Dec. 31, 2015

(51) Int. Cl.
*G06F 21/52* (2013.01)
*G06F 21/51* (2013.01)
(Continued)

(52) U.S. Cl.
CPC .............. *G06F 21/52* (2013.01); *G06F 8/656* (2018.02); *G06F 9/44536* (2013.01);
(Continued)

(58) Field of Classification Search
CPC .......... G06F 21/51; G06F 21/52; G06F 21/55; G06F 21/57; G06F 9/44536; G06F 8/656; G06F 2221/033
(Continued)

(56) References Cited

U.S. PATENT DOCUMENTS 8,321,949 B1 * 11/2012 Green ............... G06F 21/51
                                                    707/687
8,706,745 B1 *  4/2014 Cooley ............. G06F 21/564
                                                    707/758
(Continued)

FOREIGN PATENT DOCUMENTS

WO    WO 2013/138895    *  3/2012  ............ G06F 21/57

OTHER PUBLICATIONS

Franz M., "E unibus pluram: Massive-Scale Software Diversity as a Defense Mechanism," Proceedings of the 2010 workshop on New security paradigms, 2010, pp. 7-16.*
(Continued)

*Primary Examiner* — Hadi S Armouche
*Assistant Examiner* — Alexander R Lapian
(74) *Attorney, Agent, or Firm* — The Marbury Law Group

(57) ABSTRACT

Methods, devices, and non-transitory storage media for dynamic patching of diversity-based software executing on a computing device. One of many variations of various module utilized by software may be selected from a list of available module variations to be used when software is executed. An embodiment method for updating software may include obtaining or receiving a notification indicating a particular module variation that should not be used as a module for the software, and removing the module variation from the list of available module variations for the module in response to the notification. In some embodiments, the
(Continued)

notification may be received by the mobile device from a remote server, and further the notification does not include data capable of being used as a module by the software during runtime. In some embodiments, the module variation may be one of flawed, outdated, and identified as exploited by malware.

19 Claims, 9 Drawing Sheets

(51) Int. Cl.
    *G06F 9/445*     (2018.01)
    *G06F 21/55*     (2013.01)
    *G06F 21/57*     (2013.01)
    *G06F 8/656*     (2018.01)

(52) U.S. Cl.
    CPC .............. *G06F 21/51* (2013.01); *G06F 21/55* (2013.01); *G06F 21/57* (2013.01); *G06F 2221/033* (2013.01)

(58) Field of Classification Search
    USPC .......................................................... 726/22
    See application file for complete search history.

(56) References Cited

U.S. PATENT DOCUMENTS

| | | | |
|---|---|---|---|
| 2008/0016314 | A1 | 1/2008 | Li et al. |
| 2009/0282477 | A1* | 11/2009 | Chen ...................... G06F 21/51 726/22 |
| 2013/0014275 | A1* | 1/2013 | Goodes ............... G06F 9/44521 726/26 |
| 2013/0219498 | A1* | 8/2013 | Lee ......................... G06F 21/56 726/23 |
| 2013/0275963 | A1* | 10/2013 | Blaimschein ....... G06F 9/45558 718/1 |
| 2014/0032449 | A1 | 1/2014 | Kacin et al. |
| 2014/0137244 | A1* | 5/2014 | Banerjee ................ G06F 21/52 726/22 |
| 2014/0259168 | A1* | 9/2014 | McNamee .......... H04L 63/1441 726/23 |
| 2015/0220734 | A1* | 8/2015 | Nalluri .................... G06F 21/51 726/23 |

OTHER PUBLICATIONS

Anckaert B., et al., "Software piracy prevention through diversity," Proceedings of the 4th ACM workshop on Digital rights management, 2004, 9 pages.

Mont M.C., et al., "Reducing Risks of Widespread Faults and Attacks for Commercial Software Applications: Towards Diversity of Software Components," 2002, 15 pages.

O'Donnell A.J., et al., "On achieving software diversity for improved network security using distributed coloring algorithms," In Proceedings of the 11th ACM Conference on Computer and Communications Security, 2004, 11 Pages.

International Search Report and Written Opinion—PCT/US2015/036014—ISA/EPO—dated Sep. 11, 2015.

Per L., et al., "Sok: Automated Software Diversity," 2014 IEEE Symposium on Security and Privacy, IEEE, May 18, 2014 (May 8, 2014), pp. 276-291, XP032686146,ISSN : 1081-6011.

* cited by examiner

DYNAMIC PATCHING FOR DIVERSITY-BASED SOFTWARE SECURITY

BACKGROUND

Most malware today are variants of a root 'family' that exploits a known vulnerability in particular software. For example, different malware variants may seize upon a flaw, structure, idiosyncrasy, or bug within a particular operating system version, firmware, or implementation. Often, malware spreads to computing devices by networking connections with remote sources, such as software downloaded from "app" stores, and/or via device-to-device communications (e.g., short message service (SMS) text messaging, email, etc.). Despite mobile devices being typically modular and diverse in nature, utilizing discrete software (e.g., plug-n-play) to support various chips, drivers, and peripherals, malware is highly pervasive in the mobile device industry. Conventional software patches to remove or neutralize malware from infected devices may take many months (e.g., 15-20 months) or years to be rolled out in the market. For example, code fixes, firmware upgrades, and/or module updates need to be authored, tested, approved and shipped by various parties before being received at end user devices. Additionally, such patching may be expensive, requiring mobile devices to burden their resources and connectivity by downloading and installing redundant or unnecessary copies of code.

SUMMARY

Various embodiments provide methods, systems, devices, and non-transitory process-readable storage media for dynamic patching of diversity-based software executing on a mobile device. An embodiment method may include obtaining a notification indicating a module variation that should not be used as a module for the software, and removing the module variation from a list of available module variations for the module in response to obtaining the notification, wherein one of the list of available module variations is activated as the module by a mobile device processor at runtime of the software. The various embodiments may be implemented with any number of different diversity-based modules used in software, each having a plurality of module variations to provide diversity. In some embodiments, the notification may be received by a mobile device from a remote server. In some embodiments, the notification may not include data or executable code capable of being used as the module by the software. In some embodiments, the module variation may be flawed, outdated, or identified as exploited by malware. In some embodiments, the notification may be received by the mobile device during runtime of the software.

In some embodiments, the method may further include selecting a first identifier from the list of available module variations for the module at runtime of the software, and activating an available module variation associated with the selected first identifier to be used as the module during runtime of the software. In some embodiments, selecting the first identifier from the list of available module variations for the module at runtime of the software may include selecting the first identifier from the list of available module variations using a random selection algorithm. In some embodiments, activating the available module variation associated with the selected first identifier to be used as the module during runtime of the software may include generating the available module variation at runtime of the software, or loading at runtime of the software the available module variation that is pre-generated.

In some embodiments, the module may be one of a plurality of modules utilized by the software at runtime, and an embodiment method may further include selecting identifiers from lists of available module variations associated with other modules in the plurality of modules at runtime of the software, and activating available module variations for the other modules in the plurality of modules associated with the selected identifiers to be used as the other modules during runtime of the software.

Further embodiments include a mobile computing device configured with processor-executable instructions for performing operations of the methods described above. Further embodiments include a non-transitory processor-readable medium on which are stored processor-executable instructions configured to cause a mobile computing device to perform operations of the methods described above. Further embodiments include a communication system including a plurality of mobile computing devices configured with processor-executable instructions to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
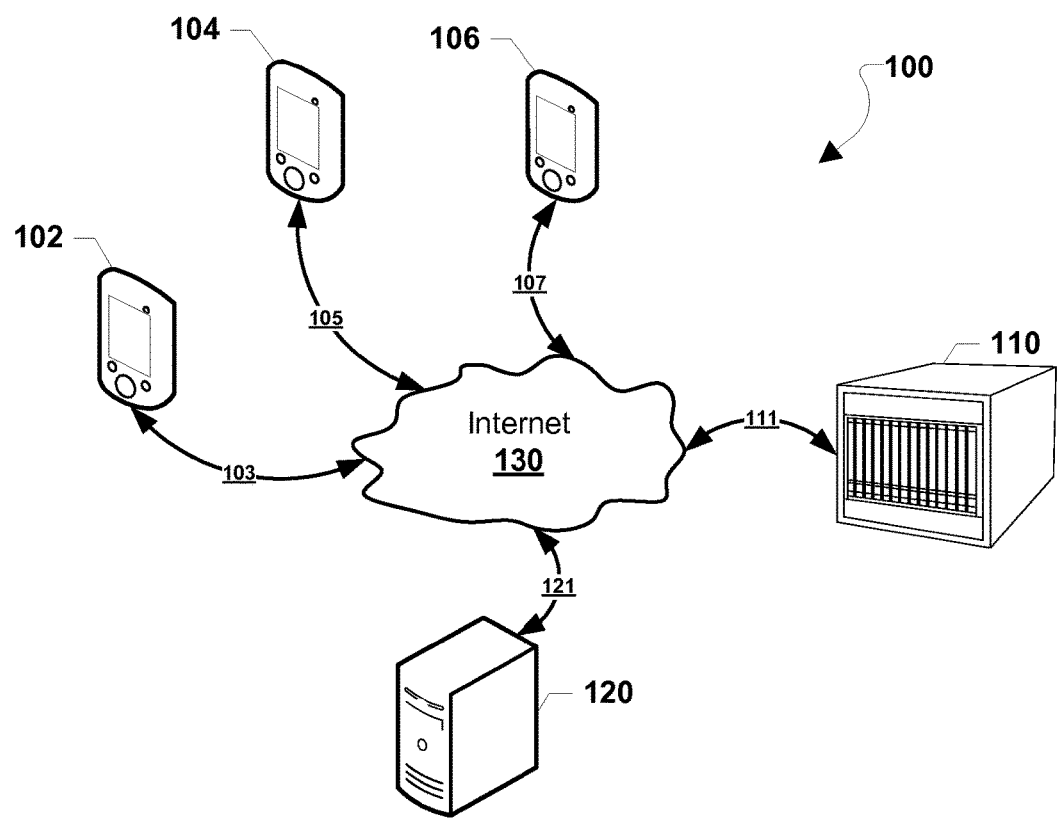
FIG. 1 is a component block diagram of a communication system that includes a plurality of mobile devices configured to execute software associated with a server suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" or "mobile device" are used herein to refer to any one or all of cellular telephones, smart-phones (e.g., iPhone), web-pads, tablet computers, Internet enabled cellular telephones, WiFi enabled electronic devices, personal data assistants (PDA's), laptop computers, personal computers, and similar electronic computing devices equipped with at least a processor. In various embodiments, such computing devices may be configured with a network transceiver to establish a wide area network (WAN) or local area network (LAN) connection (e.g., an LTE, 3G or 4G wireless wide area network transceiver, a wired connection to the Internet, or WiFi).

The terms "server" or "server computing device" are used to refer to any computing device capable of functioning as a server, such as a master exchange server, web server, mail server, applications server, document server, and a personal or mobile computing device configured with software to execute server functions (e.g., a "light server"). A server may be a dedicated computing device or a computing device executing server software (e.g., running an application which may cause the computing device to operate as a server).

The term "module" is used herein to refer to any modular, replaceable, and/or discrete component of software executing on a computing device. Modules may be associated with particular information, operations, logic, processor-readable/processor-executable instructions, subroutines, application programming interfaces, and/or function(s) that may be activated, generated, loaded, implemented, and/or otherwise configured for use during the execution of the software. For example, software modules may be included software libraries (e.g., dynamically linked libraries, etc.), routines, objects, and/or data sets that may be accessed by an application to support the operations of the application. Modules may be used by individual applications executing on a computing device and/or used by software platforms (e.g., operating systems) of the computing device used to execute individual applications. In some embodiments, common (or "universal") modules may be used by various software executing on a computing device.

In general, software of modern computing devices, such as applications and the operating systems with which applications are executed, are typically structured to be highly modular and object-oriented. For example, operating systems such as Android and Linux utilize numerous discrete software components or modules to perform functional roles of computing platforms.

To improve security and performance of software utilizing modules, software diversity techniques may be used to leverage the modularity of computing devices. Software diversity can improve security because computing devices may be configured to utilize various variations of a module and the computing devices may selectively install different module variations between different implementations, thereby reducing the chances that a particular compromised module may lead to the mobile device being "hacked." Different module variations perform the same functionality, and thus a computing device may implement any of the module variations and maintain full operability. For example, a computing device may interchangeably install one of a group of pre-generated module variations for use by software. As another example, a computing device may be configured to automatically modify (or self-modify) a small portion of code within a particular software module. Such interchangeability of software module variations may be possible due to the clear, precise interfaces (APIs) utilized for drivers, peripherals, and sub-systems of computing devices, such as Android smartphones.

The term "module variation(s)" is used herein to refer to individual, diverse implementations (or versions) of a module used by software executing on a computing device. Module variations of a particular module may be formatted or structured differently and/or include different information from one another. For example, a first module variation of a first module may utilize a first order of instructions and a second module variation of the first module may utilize a second order of instructions. As another example, a first module variation of a first module may be generated based on a first source code and a second module variation of the first module may be generated based on a second source code. Module variations of the same particular module may be used by software in the same manner and to achieve the same functionality or operational effect. For example, an application may call a function from a first module variation of a first module to receive a first value, and may call the function from a second module variation of the first module to receive the same first value. As another example, a mobile device may utilize a first module variation or a second module variation to implement a WiFi module.

By including similar yet diverse forms of modules, control flows of diversity-based software may be different in between different installations of the software on different devices. This inconsistency through module variations may decrease the probability that software includes exploitable vulnerabilities, thus making it more difficult for malware directed to particular module variations to successfully exploit the same vulnerability in the software on different devices. Software diversity may also impede the spread of malware to other devices via various connectivity (e.g., hijacking via SMS), as the number of compromised devices capable of executing and spreading the malware may be decreased. In other words, with purposefully inconsistent software, systemic threats (e.g., malware, viruses, programming bugs or flaws, etc.) may only affect some but not all module variations of the software, and thus the extent to which nefarious code or unforeseen programming flaws may negatively affect the community of computing devices that execute the software may be reduced. Applications that randomly select a particular module variation at runtime may thus be unpredictable in terms of its software vulnerabilities, thereby providing a layer of protection against hacking and exploitation.

The various embodiments leverage the concept of software diversity to enable efficient and timely updates to software modules to respond to newly discovered software flaws and attacks by informing computing devices of a particular module that should no longer be used, effectively deactivating a flawed or vulnerable module. Various embodiments provide methods, which may be implemented on computing devices and systems, and stored on non-transitory process-readable storage media, for dynamic patching of diversity-based software executing on a computing device. Runtime selections of module variations of modules of software executing on the computing device may be intelligently controlled based on notifications received from trusted parties, such as from remote servers associated with the software (e.g., developer or original equipment manufacturer servers, etc.) or from applications or services executing on the computing device itself (e.g., malware protection software, etc.). In some embodiments, the computing device may receive the notifications (e.g., messages, signals, etc.) from original equipment manufacturers (OEMs), operators, trusted application developers, enterprise entities (e.g. the company that owns the device being used by the consumer), or security providers (e.g., virus protection software service, etc.) that indicate identifiers of module variations of modules of the software that are known to be flawed, outdated, or otherwise include bugs. Such notifications may be light-weight communications, such as a module variation identifier, avoiding the need to upload patches or updated software in the form of executable code or data, replacement module binaries or source code. In response to receiving a notification, the computing device may configure a module variation selection mechanism to avoid using the identified module variation in subsequent runtime selections. In this manner, the computing device may quickly implement (e.g., reload or re-compute) more secure modules at runtime of the software by using software diversity selection operations that ignore compromised module variations. In some embodiments, the computing device may deselect identifiers from lists of available module variations in response to such notifications. Compromised modules may be deleted from memory, or may be left in memory and simply not selected at runtime.

In some embodiments, notifications may include the identifiers of uncompromised module variations that may be used to implement the module of the software. In other words, instead of identifying modules that should not be selected, notifications may update a list of identifiers of modules from which a module may be selected at runtime. For example, instead of ignoring identifiers in notifications, the computing device may only select and implement module variations that are reported by a trusted remote server as currently valid.

As compromises in software modules occur over time and module variations may be delimited based on received notifications, the possible module variations for a particular module may become limited, weakening the benefits of software diversity within the computing device. For example, due to compromises reported in notifications, the computing device may only be able to select from a small number of the original large number of module variations of a certain module. To address this, in some embodiments, the computing device may receive periodic patches or software updates from remote devices (e.g., OEM/developer servers, etc.) that include new software module variations for storage in memory that do not include known flaws/bugs. In this manner, software may evolve and the benefits of software diversity may be maintained by continually providing the computing device with additional, uncompromised module variations from which a module may be selected at runtime of any software using the module.

In some embodiments, runtime module selections from among the module variations may be accomplished by the computing device via a small, trusted dynamic loader (or selection logic) that can securely activate (e.g., generate or load/replace) a module or portion of a module (e.g., a library, etc.).

In some embodiments, various module variations from which a particular module may be selected during runtime of software may be pre-generated or pre-computed. For example, the computing device may activate one of many different implementations for a particular module provided by programmers at the time of producing a software suite or system. Such pre-generated module variations may be pre-loaded onto the computing device, and thus such a technique may not be scalable.

In some embodiments, the computing device may be configured to dynamically generate module variations during runtime or periodically. For example, at runtime of the software and based on a selected module variation, the computing device may utilize known techniques for self-modifying code to create a new implementation of a particular module.

In some embodiments, the computing device may be configured to select a particular module from a number of module variations for use at runtime based on random selection policies. For example, the computing device may use a random selection mechanism to choose a certain implementation of a WiFi module. Such random selection mechanisms may be the most difficult for malware designers to account for because the particular module implemented when an application executes may be unpredictable. In some embodiments, the computing device may select module variations based on other information accessible to the computing device and/or the software, such as the number of times a particular module variation has been used by the software, the complexity of the module variations, the similarity of a particular module to compromised module variations, the similarity of a particular module to already selected module variations of other modules of the software, and other characteristics of the module variations that may make each more or less likely to be flawed or otherwise compromised.

The embodiment techniques enable patching that does not require computing devices to request and/or process software downloads or other expensive operations to overcome compromised modules of software. Instead, a server simply informs computing devices of an identifier of a flawed module variation. Then upon execution of software implementing the module, computing devices select a particular module to use at runtime from available module variations that exclude the identified flawed or compromised module.

Some conventional techniques implement a form of software diversity by installing randomly selected modules at installation time or load time, such as by installing a first module variation and deleting the rest when an application is installed on a device. Unlike these conventional techniques, the embodiment techniques select at runtime between available module variations that have been identified to be safe or of have not be identified as being unsafe, with the selection of a particular module made each time the software is executed. The embodiment techniques may use lists of identifiers that may be adjusted based on notifications from trusted sources. Computing devices may be configured to update the lists of possible module variations for any module of the software based on reports of compromised identifiers, removing a module variation identifier from a runtime selection list in response to a signal indicating a compromise of a corresponding module variation. In this manner, a community of devices implementing the same software module variations may easily remove certain module variation identifiers from being considered for activation at runtime of software using such modules.

For simplicity, the various embodiment techniques for dynamic patching for diversity-based software security may be described below as applied to mobile devices. However, it should be appreciated that the various embodiment techniques may be used with any computing devices capable of executing modular software, such as laptops, servers, game consoles, personal computers, etc.

Further, the following descriptions indicate that software may utilize a plurality of modules, each of the modules having a plurality of module variations. However, some software (e.g., an application) may not utilize a plurality of modules, but instead include a single module that may have a plurality of module variations. Therefore, the embodiments are not intended to be limited to software that utilizes a plurality of modules.

FIG. 1 illustrates an embodiment communication system 100 that includes a plurality of mobile devices 102-106 configured to execute software associated with a server 110. The mobile devices 102, 104, 106 may be configured to exchange communications or signals over a wide area network, such as the Internet 130, via wired or wireless connections 103, 105, 107, respectively. For example, the mobile devices 102-106 may communicate over the Internet 130 via wireless connections to cellular network base stations (not shown) and/or a Wi-Fi router (not shown) associated with a local area network. Examples of such communications may include short message service (SMS)/ multimedia messaging service (MMS) text messages, email messages, voice calls (e.g., Voice Over Internet Protocol (VOIP)), etc. Similarly, the server 110 may be configured to exchange data and/or various communications over the Internet 130 via a wired or wireless connection 111. In particular, the mobile devices 102-106 may be capable of communicating with the server 110 via the Internet 130. For example, the server 110 may push ad-hoc information to the mobile devices 102-106. As another example, the mobile devices 102-106 may be configured to download code, files software, data, information, etc., from the server 110.

In one scenario, the server 110 may be configured to communicate notifications that include identifiers of module variations of modules of the software executing on the mobile device 102-106. Such notifications may be used by receiving mobile devices 102-106 to control dynamic module selection operations that may be performed by the mobile devices 102-106 when running the software (i.e., at or during runtime). For example, the notifications may include the identifiers of a module variation of a first module of the software that should not be used when executing the software due to an identified flaw, weakness, or report exploit of that variation.

In various embodiments, the mobile devices 102-106 may be registered with an updating service (or updating entity) for the software (e.g., operating system, firmware, middleware, application/app/client, etc.) associated with the server 110. In particular, the server 110 may be configured to store and process information associated with the mobile devices 102, 104, 106 and the software installed on each. For example, the server 110 may be configured to receive and store data describing the version of the software stored on any of the mobile devices 102-106, the communication capabilities (e.g., cellular network data plans, etc.), as well as the modules supported by the respective software installations on the mobile devices 102-106. As another example, the server 110 may be configured to store information describing faults, compromises, errors, and other negative conditions encountered by the software executing on the mobile devices 102-106. The server 110 may store and process such information related to the mobile devices 102-106 in order to identify, monitor, and report occurrences of improperly performing (e.g., breached, buggy, broken, etc.) modules within the software.

In some embodiments, the server 110 may receive communications from a third-party server 120 connected to the Internet 130 via a wired or wireless connection 121. Such communications may include malware reports, such as virus or "Trojan horse" malware definitions. For example, the third-party server 120 may be associated with a service or entity that monitors for viruses encountered by various devices and transmits definitions used by commercial virus protection software.

Figure 2A:
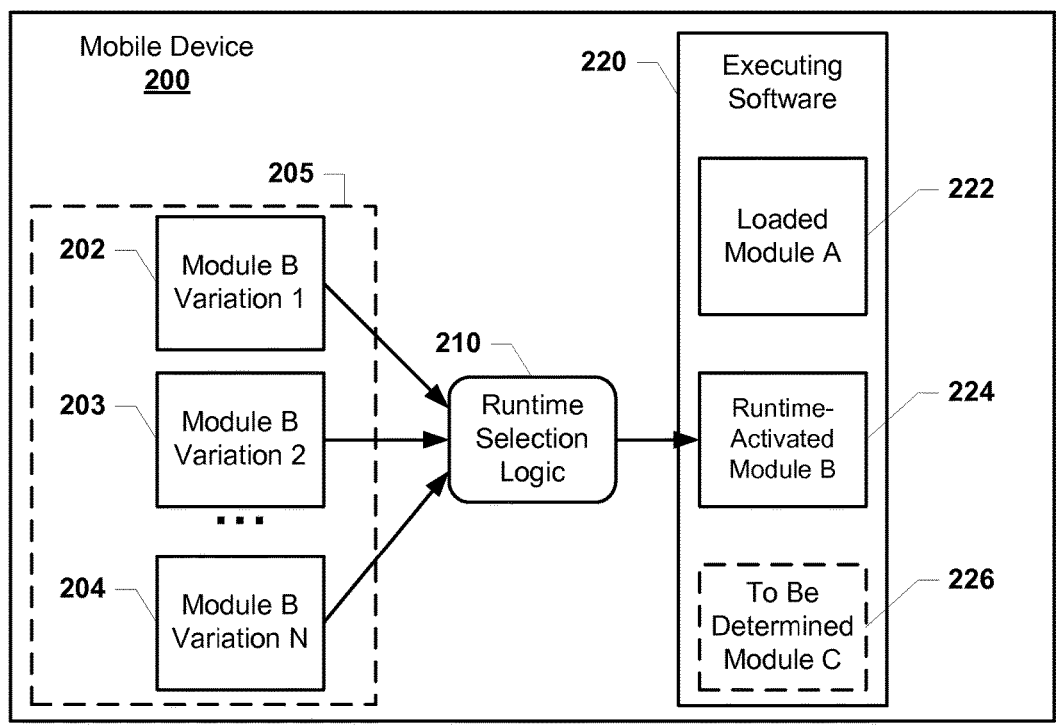
FIG. 2A is a component block diagram that illustrates an exemplary mobile device configured to utilize one of a plurality of possible module variations to implement a module at runtime of installed software suitable for use in various embodiments.

FIG. 2A illustrates an exemplary mobile device 200 configured to utilize one of a plurality of possible module variations to implement a software module at runtime of installed software. As described above, to improve security, the mobile device 200 may use a diversity scheme with multiple, functionally equivalent variations of various software modules stored on the mobile device and available for use with any software application implementing the modules. In various embodiments, a processor of the mobile device 200 may execute a runtime selection logic 210 to identify one of a group 205 of possible module variations 202-204 (referred to as "Module B Variation 1", "Module B Variation 2", and "Module B Variation N", respectively in FIG. 2A) to be used to implement a particular module (referred to as "Module B") used by an installed and executing software 220 (e.g., an application, operating system routine, etc.). In some embodiments, the runtime selection logic 210 may be a routine or process executed on a processor of the mobile device 200.

As shown in FIG. 2A, when the software 220 enters a runtime phase (e.g., begins execution via the processor of the mobile device 200 after being installed, loaded, and otherwise prepared for execution), the mobile device 200 via the runtime selection logic 210 may generate and make accessible various modules for the software 220. The executing software 220 may include a first module 222 (referred to as "Loaded Module A" in FIG. 2A) that may or may not be selected and/or activated at runtime by the runtime selection logic 210. In other words, the software 220 may be configured to utilize a portion of modules that are static (i.e., not diversified) and a portion of modules that are dynamically selected at runtime from a set of module variations (i.e., diversified).

Additionally, the mobile device 200 via the runtime selection logic 210 may evaluate the group 205 of possible module variations 202-204 and select one to be used as a second module 224 (referred to in FIG. 2A as "Runtime-Activated Module B"). Such a runtime selection of one of the module variations 202-204 may be random. For example, each of the module variations 202-204 may have the same likelihood of being randomly selected by the mobile device 200 via the runtime selection logic 210. Alternatively, the mobile device 200 may utilize various techniques for selecting one of the module variations 202-204, such as based on a weighting scheme or other predefined information stored by the mobile device 200. For example, the runtime selection may be based on the number of previous uses of each of the module variations 202-204 in previous executions of the software 220 by the mobile device 200. As another example, the selection may be based on the rating, priority, and/or efficiency of the module variations 202-204. The mobile device 200 via the runtime selection logic 210 may then activate (e.g., generate, insert/load) the second module 224 based on the selection of one of the module variations 202-204.

In another embodiment, the runtime selection of one of the module variations 202-204 may be based on the modules already selected and/or their module variations. For example, the mobile device 200 may select the first module variation 202 (referred to as "Module B Variation 1" in FIG. 2A) instead of the second module variation 203 (referred to as "Module B Variation 2" in FIG. 2A) based on the variation used in the loaded first module 222. In other words, weighting factors used by the mobile device 200 when selecting a module variation for a certain module may be affected by or otherwise include indications of already-loaded variations of other modules.

In various embodiments, the group 205 may be represented in the mobile device 200 as a stored list of identifiers of the module variations 202-204, such as a linked list or array including nodes or entries each indicating an identifier for one of the module variations 202-204. In various embodiments, the mobile device 200 using the runtime selection logic 210 may dynamically modify a predefined module using the selected module variation in order to generate the second module 224. For example, the runtime selection may be a selection of a particular instruction for the mobile device 200 to modify (or "self-modify") the second module 224 using a certain algorithm, code, application programming interface (API), and/or other manner of structuring the module.

After the runtime selection operations are performed with regard to the second module 224, the mobile device 200 using the runtime selection logic 210 may continue to perform additional runtime selection operations for other modules, such as for a third module 226 (referred to as "To Be Determined Module C"). For example, the mobile device 200 may load a predefined module for the third module 226 or generate a new or modified module based on a selection similar to as performed for the second module 224.

Figure 2B:
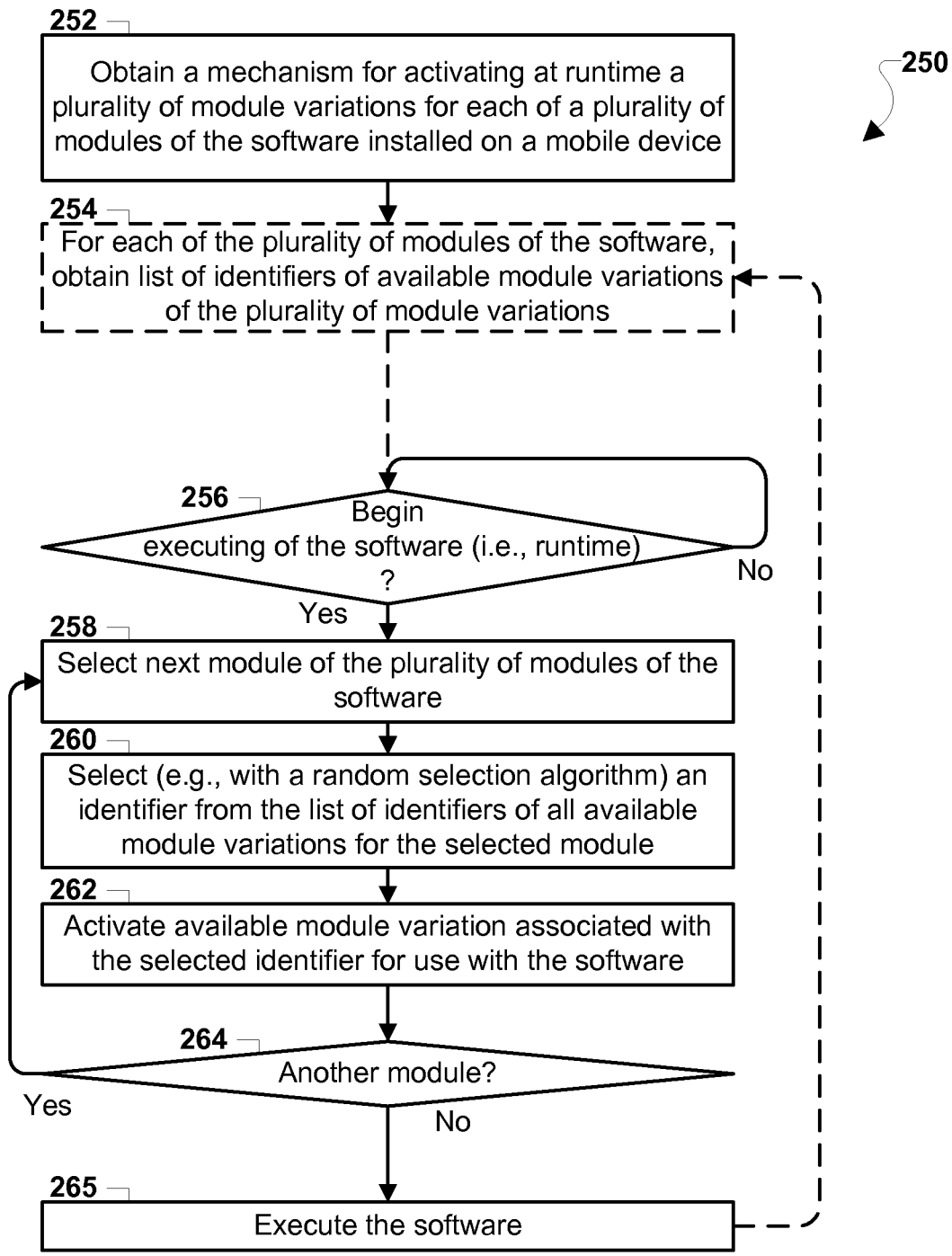
FIG. 2B is a process flow diagram illustrating an embodiment method for a mobile device to utilize variations of modules at runtime of software.

FIG. 2B illustrates an embodiment method 250 for a mobile device to utilize variations of modules at runtime of software. Once the software (e.g., application, operating system, etc.) has been installed and loaded by the mobile device for execution, the mobile device may dynamically choose between the available module variations for a plurality of modules used by the executing software. For example, the mobile device may select a first module variation for a first module instead of a similarly-functioning second module variation. The mobile device may perform the operations of the method 250 so that available module variations may be selected and activated each time the software is executed. In this way, the mobile device may implement a software diversity scheme to potentially remove the control path (or control flow) used by malware to attack the executing software.

In block 252, the processor of the mobile device may obtain a mechanism for activating at runtime a plurality of module variations for each of the plurality of modules of software installed on the mobile device. The mechanism may be logic, routines, software, predefined variables, circuitry, and/or other functionality that may enable the mobile device processor to activate (e.g., insert or load within executing software), generate, and/or modify modules at the runtime of the executing software. For example, the mechanism may be an algorithm the mobile device may execute to procedurally generate libraries, code, or other information that may be dynamically inserted, loaded, and/or linked into the operating instructions of an executing application. Further, the mechanism may be standardized (or "universal") such that various computing devices, including the mobile device, may be capable of utilizing the mechanism to generate (or reproduce) the same module variations. For example, a first mobile device and a second mobile device may both be configured to utilize the mechanism to generate the same module variation for use in an application. In some embodiments, the obtained mechanism may be code, an algorithm, instructions, logic, and/or other information for modifying code in modules of the software. For example, the mechanism may include instructions executed by the mobile device to change the control flow of instructions of a predefined module. In various embodiments, the mechanism may be received by the mobile device from a remote source, such as via a download from a remote server (e.g., an application server). In other embodiments, the mechanism may be pre-installed on the mobile device by a manufacturer, user, and/or developer of the mobile device. In some embodiments, the mechanism may utilize predefined codes to generate variations of a module. For example, the mobile device may utilize a routine (e.g., a code-modifying algorithm) that generates a module in different ways using module variation identifiers as seeds for the routine. In some embodiments, the mechanism may be a runtime selection logic as described above with reference to FIG. 2A.

As described above, at a given time, any module of the software may be associated with a predefined set of possible module variations. For example, a developer may have written a set number of variations of a program or variations of a portion of a program, each capable of performing the same function when employed by the software. As another example, module variations of a module may be generated at runtime of the software by mobile devices based on one or many different instruction sets stored on the mobile devices. Each of these module variations may be associated with a universal identifier, code, or other descriptor so that the various mobile devices utilizing the software may reference the same module variations in a standardized way. Such uniform identifying information for module variations may be maintained by a remote source (e.g., a server associated with the support of the software) that may share the identifying information with the various mobile devices executing the software.

In optional block 254, for each of the plurality of modules of the software, the processor of the mobile device may obtain a list of identifiers of available module variations of the plurality of module variations. For example, the list may be received by the mobile device via a message from a server associated with the software. As another example, the mobile device may generate the list based on the module variations the mobile device is capable of utilizing determined immediately upon installation of the software. As another example, the list may be a list of identifiers pre-loaded onto the mobile device. The list may simply include identifiers for each module variation of the plurality of module variations for each module. However, in some embodiments such as described below, the list may be configurable such that the mobile device may update the available module variations for each module. For example, the list may be a queue, linked list, or other data structure that is capable of appending or removing various module variation identifiers, indicating these module variations are available or no longer available, respectively. In some embodiments, each item within the list may be associated with a variable, flag, or other data that may represent the current availability of the associated module variation. For example, each module variation represented in the list may be associated with a bit that indicates whether that module variation may be selected for use by the mobile device.

Sometime after the operations of blocks 252-254 are performed by the mobile device, the processor of the mobile device may determine whether to begin executing the software in determination block 256. In other words, the mobile device may determine whether the software has been configured to begin its runtime phase. Installed software may enter its runtime phase in response to the software being prepared (e.g., loaded) for execution by the mobile device processor. The mobile device may begin executing the software in response to various conditions, such as received user inputs (e.g., user clicking on an executable or icon associated with the execution of an application, etc.), receiving a signal from another device (e.g., a start signal from another mobile device, etc.), and/or detecting the occurrence of some other predefined operating condition (e.g., GPS coordinates indicating a location within a pre-associated geofence, etc.). For example, the mobile device may determine to begin executing the software in response to detecting a user selection input on a touch screen that corresponds with a graphical icon for the software. As another example, the mobile device may determine that it should begin or activate a runtime phase of the software in response to receiving an interrupt, command, or other signal indicating that the software (e.g., software, etc.) should begin its runtime execution. In response to determining that the software has not begun executing (i.e., determination block 256="No"), the mobile device may continue to perform the checking/monitoring operations in determination block 256. For example, the mobile device may continue to evaluate whether the software has begun execution while the software is still being loaded and/or until a user input is received that causes the software to be loaded and eventually executed on the mobile device processor.

In response to determining that the software has begun executing (i.e., determination block 256="Yes"), the processor of the mobile device may select a next module of the one or more modules of the software in block 258. For example, for the first iteration of the operational loop comprised of the operations of the blocks 258-264 (i.e., when the mobile device enters its runtime phase), the mobile device may select the first module in a list of all modules to be dynamically generated (or loaded) for use by the software. In block 260, the processor of the mobile device may select an identifier from the obtained list of identifiers of available module variations for the selected module. For example, the mobile device may utilize a random selection algorithm that randomly selects one of the identifiers of the available module variations. The selection may be based on other factors as described above, such as how often the module variations have been employed in past executions of the software, the complexity of the module variations compared to one another, etc.

In block 262, the processor of the mobile device may activate the available module variation associated with the selected identifier for use with the executing software. For example, when the available module variation corresponding to the selected identifier is pre-generated, the mobile device may load the available module variation at runtime of the software. As another example, the mobile device may generate the available module variation to be used by the executing software, such as by using the obtained mechanism (e.g., routine, etc.) to generate the module based on the selected module variation identifier. As another example, the mobile device may modify a module or generate code for insertion within the module using instructions for modifying the module related to the selected identifier. In response to the operations performed by the mobile device in block 262, the module associated with the selected module variation may be accessible and otherwise capable of being fully utilized by the software. In various embodiments, generating the available module variation may include reorganizing a control flow within code of a module based on instructions of the available module variation. For example, the mobile device may change operations (e.g., jumps or "GOTO" statements, etc.) and/or the order of operations within a block of assembly language code for a module.

In determination block 264, the processor of the mobile device may determine whether there is another module of the software for which the mobile device must select and activate (e.g., generate) a module variation at runtime. In response to determining that there is another module of the software (i.e., determination block 264="Yes"), the mobile device may continue with the next module and the selection operations in block 258. However, in response to determining that there is not another module of the software (i.e., determination block 264="No"), processor of the mobile device may execute the software in block 265. In some embodiments, the processor of the mobile device may continue with the operations in determination block 256 to determine whether a subsequent runtime phase has begun after the operations of block 265 have completed.

Figure 2C:
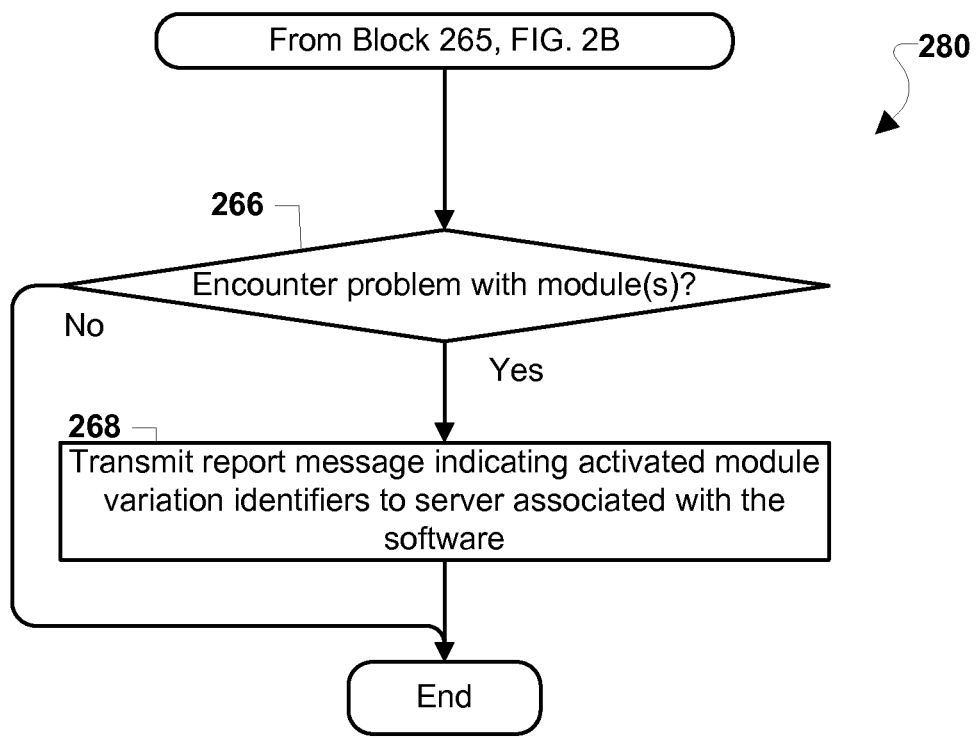
FIG. 2C is a process flow diagram illustrating an embodiment method for a mobile device to transmit report messages indicating problems encountered with module variations.

FIG. 2C illustrates an embodiment method 280 for the mobile device to report problems encountered while executing software. Such problems, such as failures or malware detections, may be used to determine how software diversity of modules for the software may be adjusted in future executions of the software. The operations of the method 280 may be performed in combination with the methods 250, 400, and/or 450 described herein.

The method 280 may be performed once the software has begun executing on the processor of the mobile device, or alternatively after the software has been configured to no longer actively execute on the processor. Thus, in response to performing the operations in block 265 described above with reference to FIG. 2B, the mobile device may determine whether a problem with the module(s) has been encountered during runtime of the software in determination block 266. For example, the mobile device may detect a fault, crash, and/or unexpected operation when executing the software. Such detected information may be stored by the mobile device in a log file or other data that may be evaluated after the runtime phase of the software has completed, or alternatively during the execution of the software. In response to determining that a problem was encountered (i.e., determination block 266="Yes"), the mobile device may transmit a report message indicating the activated module variation identifiers currently in use to a server associated with the software in block 268, such as a developer or OEM server. As described below with reference to FIG. 5, such report messages may be evaluated and used by the server to identify potential compromises of the module variations. In response to determining that a problem was not encountered (i.e., determination block 266="No"), or the operations in block 268 were performed, the mobile device may end the method 280.

Figure 3A:
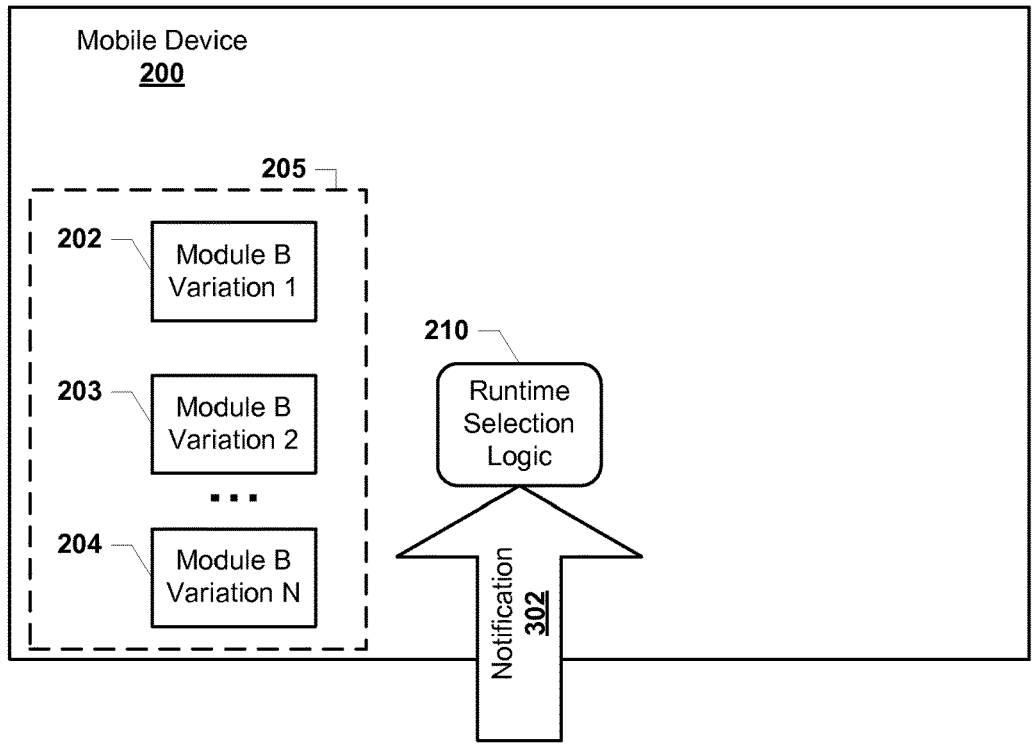
FIGS. 3A-3B are component block diagrams that illustrate an exemplary mobile device configured to utilize one of a plurality of possible module variations to implement a module at runtime of software based on received notifications of compromised module variations suitable for use in various embodiments.
Figure 3B:
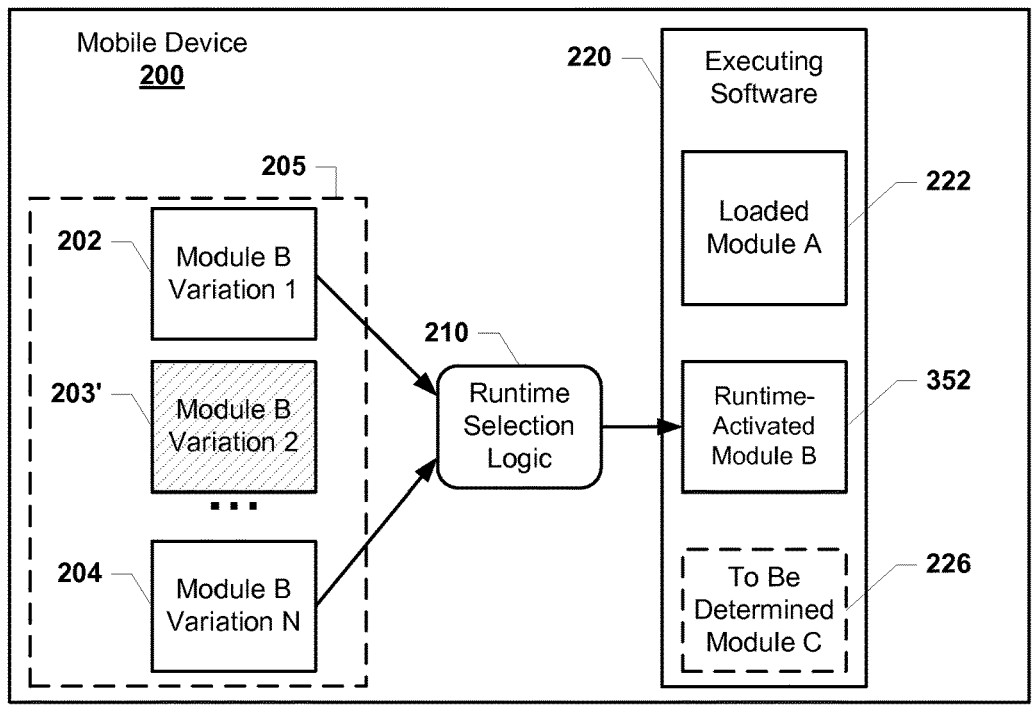

FIGS. 3A-B illustrate an exemplary mobile device 200 configured to utilize one of a plurality of possible module variations to implement a software module at runtime based on received notifications of compromised module variations. The scenario illustrated in FIG. 3B is similar to the scenario described above with reference to FIG. 2A, except in the FIG. 3B, the mobile device 200 may adjust the selection of module variations to reflect data received by the mobile device 200 indicating particular variations that are no longer suitable for use as modules of the software of the mobile device 200. For example, instead of receiving a large patch from a server via the Internet, the mobile device 200 may delimit the possible module variations that may be generated at runtime for use in an application in response to receiving a simple notification indicating only a module variation identifier. As described above, such notifications may be transmitted by remote sources, such as a server associated with the software of the mobile device 200, and/or internal applications executing on the mobile device 200.

As shown in FIG. 3A and described above with reference to FIG. 2A, a processor of the mobile device 200 may execute a runtime selection logic 210 that may be configured to identify one of a group 205 of possible module variations 202-204 to be used to implement a particular module (referred to as "Module B") used by installed software that may be executed by the mobile device 200. Each of the module variations 202-204 may be available for selection by the mobile device 200 via the runtime selection logic 210. However, unlike in FIG. 2A, the mobile device 200 in FIG. 3A may receive a notification 302 that may be used to adjust the availability of the individual module variations 202-204. The notification 302 may include one identifier or a plurality of identifiers of the module variations 202-204 that may be used by the mobile device 200 via the runtime selection logic 210 to remove one or more of the plurality of module variations 202-204 from eligibility of being selected to implement the particular module (e.g., "Module B"). For example, the mobile device 200 using the runtime selection logic 210 may remove identifiers indicated within the notification 302 from a list of available module variations.

In particular, the notification 302 may indicate that the second module variation 203 of the group 205 may no longer be available for selection by the mobile device 200 via the runtime selection logic 210. For example, the notification 302 may indicate that an identifier associated with the second module variation 203 has been associated with a security breach (i.e., has been compromised by malware, etc.).

As shown in FIG. 3B, in response to the notification 302, the mobile device 200 via the runtime selection logic 210 may adjust the group 205 such that the second module variation 203' (referred to as "Module B Variation 2" in FIG. 3B) is no longer available for selection and/or implementation. When the installed software 220 enters a runtime phase (e.g., begins execution via the processor of the mobile device 200 after being loaded and otherwise prepared), the mobile device 200 via the runtime selection logic 210 may only select the first module variation 202 (referred to in FIG. 3A as "Module B Variation 1") or the last module variation 204 (referred to in FIG. 3A as "Module B Variation N") in order to implement a second module 352 (referred to in FIG. 3A as "Runtime-Activated Module B"). In other words, based on the selection by the mobile device 200 via the runtime selection logic 210, the second module 352 may correspond to all but the second module variation 203'. In some embodiments, the mobile device 200 may not delete the information associated with the second module variation 203', but instead may set a flag or variable to indicate invalidity or an unavailable status of the second module variation 203'. For example, when pre-generated, the second module variation 203' may remain stored on the mobile device 200 after receiving the notification 302.

Figure 4:
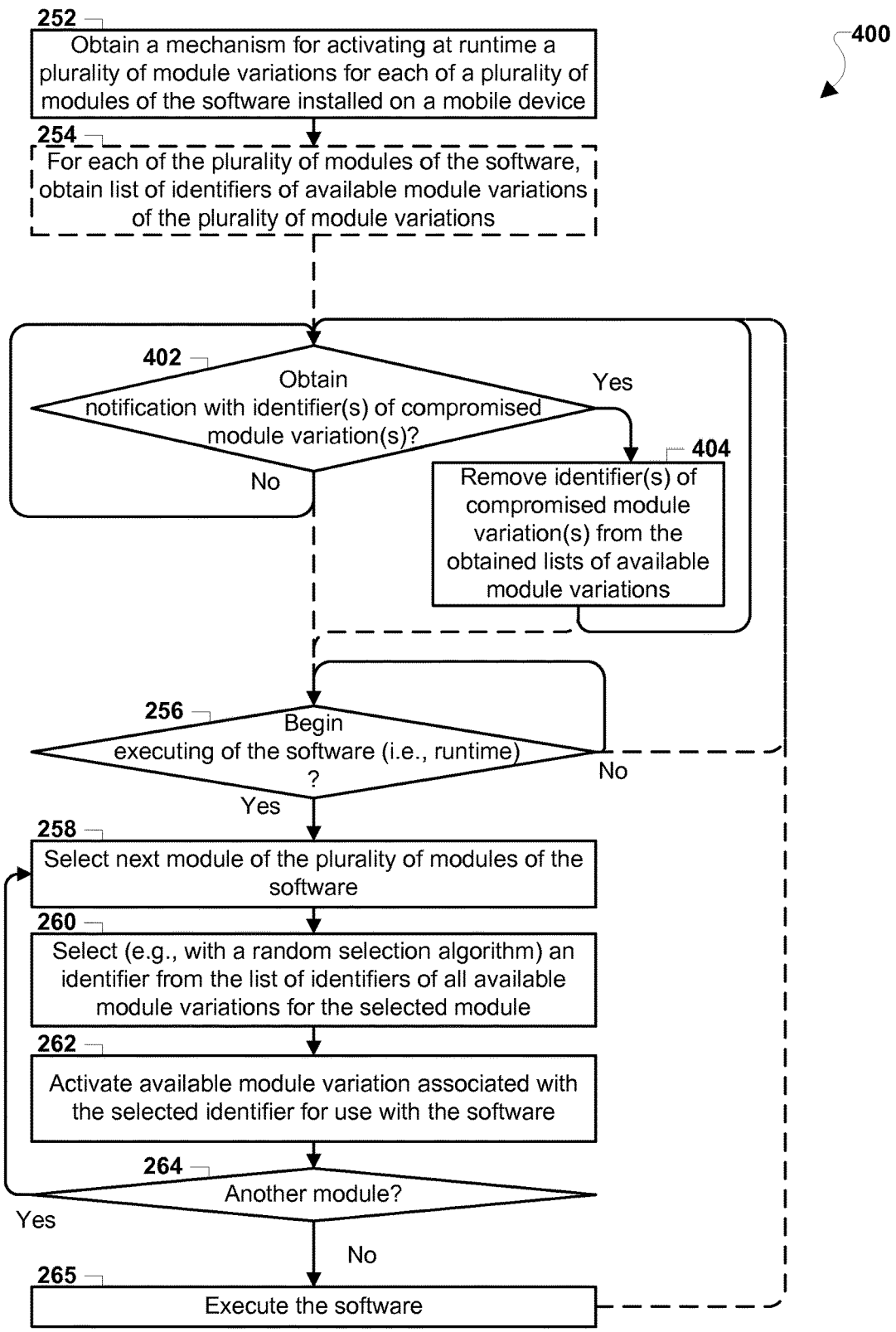
FIG. 4 is a process flow diagram illustrating an embodiment method for a mobile device to receive notifications to delimit the possible module variations of modules that may be implemented at runtime of software.

FIG. 4 illustrates an embodiment method 400 for a mobile device to receive notifications to delimit the possible module variations of modules that may be implemented at runtime of software. The method 400 is similar to the method 250 described above, except the method 400 may configure the mobile device to adjust the availability of module variations of a module in response to communications (or notifications) indicating the module variations have been compromised. Notifications, such as signals from remote server computing devices configured to update the mobile device, may indicate the range of identifiers that the mobile device may not use when selecting from available module variations. For example, a message or signal from a server may indicate that a certain module variation identifier has been compromised due to a virus or other malware, and thus should not be considered when the mobile device is generating the related module for the software at runtime. Such notifications may most simply include only identifiers of module variations that have been identified as compromised. Regardless of their source, structure, or transmission technique, notifications may not include module variations themselves and/or data needed to generate the module variations, such as source code or binaries. In this way, the notifications may be a cheap, efficient way of providing dynamic patching of modules to mobile devices without requiring the mobile device to expend substantial resources to adjust its software diversity scheme.

The operations of blocks 252-265 are described above with reference to FIG. 2B. Sometime after performing the operations of blocks 252-254, the processor of the mobile device may determine whether a notification with identifier(s) of compromised module variation(s) is obtained in determination block 402. For example, the mobile device may monitor a receiving circuit to determine whether a message is received via a network connection from a remote server or another mobile device indicating identifiers of module variations of a module for the software that have recently been discovered to have been compromised by malware. The module variations associated with the identifiers included in the notification may be identified as compromised due to many reasons, such as being flawed (e.g., including known bugs, etc.), outdated (e.g., outside of a predefined freshness threshold set by developers, manufacturers, etc.), and/or known to have been exploited by malware.

The notification may include various information, such as identifying information of the module(s) related to the compromised module variation(s), identifying information and/or authenticating information of the sender of the notification, timestamp information, version information, and other data that may be used by the mobile device to validate the notification. However, the notification may not include executable code or data capable of being used as a module by the software during runtime. In other words, the notification may not be a delivery mechanism for executable code, modules, or portions of code, but instead merely indicator(s) of module variations that may not be used by the software.

In some embodiments, the notification may be a message generated locally by the mobile device, such as a warning or other report generated by a security application executing on the mobile device. For example, the mobile device may be configured to perform operations to continually evaluate security breaches within the software and identify module variations affected by the breaches. In response to determining that the notification of identifier(s) of compromised module variation(s) has not been obtained (i.e., determination block 402="No"), the mobile device may continue with the monitoring operations in determination block 402.

In response to determining that the notification of identifier(s) of compromised module variation(s) has been obtained (i.e., determination block 402="Yes"), the processor of the mobile device may remove the identifier(s) of the compromised module variation(s) from the obtained notification from the obtained lists of the available module variations in block 404. For example, the mobile device may remove references to the identifiers of the notification from a stored list of available module variation identifiers. As another example, the mobile device may set an invalid flag for entries in a database that includes the identifiers of all module variations that may be generated by the mobile device with regard to the software. By removing the identifiers, the mobile device may be disabled from selecting and activating the module variations associated with the identifiers, thus improving security by not considering module configurations that may be flawed or exploited by malware. In response to performing the operations in block 404, the mobile device may continue with the monitoring operations in determination block 402. In other words, the mobile device may indefinitely monitor for incoming notifications in between runtime phases of the software.

Although the mobile device may continually monitor for incoming notifications and adjust the lists of available module variations, the mobile device may eventually be configured to execute the software (i.e., enter its runtime phase), at which time the mobile device may be configured to select from whatever module variations are available at that time.

Sometime after the operations of determination block 402 or block 404 are performed, the processor of the mobile device may perform the operations of blocks 256-265 as described above with reference to FIG. 2B.

In some embodiments, the mobile device may be configured to continue performing the operations in determination block 402 once the software has completed execution on the mobile device processor (i.e., exited runtime phase). For example, the mobile device may continue with the operations in determination block 402 when an application has been closed, terminated, or otherwise ceased to actively operate. In some embodiments, the mobile device may continue with the operations of blocks 404-404 during the runtime phase of the software. Additionally, in some embodiments, during a runtime phase of executing the software, the mobile device may perform operations for determining whether problems are encountered with the modules and transmitting report messages as described above with reference to determination block 266 in FIG. 2C.

In some embodiments, when a notification regarding a particular module variation to be replaced is received while software using the module is already executing on the processor of the mobile device, the mobile device may be configured to interrupt or otherwise pause the execution of the software in order to load new module variations. Such an interruption may or may not require the mobile device to reload all modules used by the software.

Figure 5:
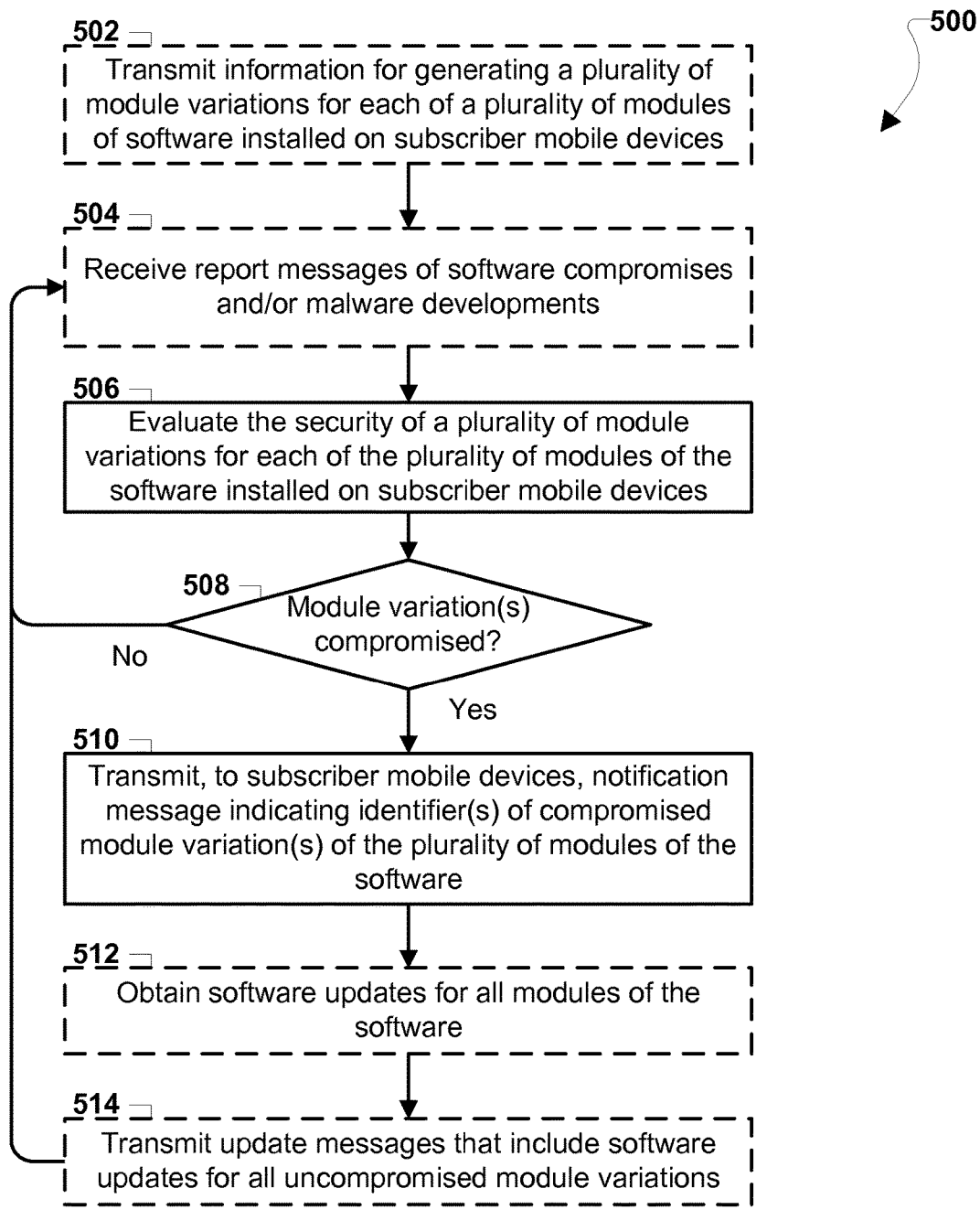
FIG. 5 is a process flow diagram illustrating an embodiment method for a server computing device (or server) to transmit notifications related to compromised module variations for modules of software executed by subscriber mobile devices.

FIG. 5 illustrates an embodiment method 500 for a server computing device (or server) to transmit notifications related to compromised module variations of modules of software executed by mobile devices. As described above, a server associated with software, such as an applications server, OEM server, or developer server dedicated to supporting particular applications or operating systems, may be configured to continually receive and process information that may indicate problems with the software. Working as a clearinghouse for crowd-sourced security information about the software, the server may transmit notifications to mobile devices having already installed the software and registered with (or known to) the server (referred to as "subscriber mobile devices" with reference to FIG. 5). For example, the server may transmit notifications that inform subscriber mobile devices of compromised module variations that may no longer be implemented as modules used with the software. Thus, the server may enable cheap and dynamic patching of devices utilizing software diversity schemes.

In optional block 502, the server may transmit information for generating a plurality of module variations for each of the plurality of modules of software installed on subscriber mobile devices. For example, the server may transmit instructions, code, logic, software, and/or other information that subscriber mobile devices may use to modify predefined modules during runtime of an installed application. As another example, the server may simply transmit multiple variations of software modules that may be interchangeably activated at runtime of the software. In some embodiments, the server may transmit the rules or guidelines that may be used by subscriber mobile devices to select between module variations of modules. For example, the server may push file transfers to subscriber mobile devices that include executable code (e.g., runtime selection logic) that may cause the subscriber mobile devices to randomly select between module variations at runtime of the software.

In optional block 504, the server may receive report messages of compromises and/or malware developments. The information within the report messages may include malware definitions (e.g., virus names, identifying information, etc.), bug reports for the software, affected or compromised modules or module variations of the software, as well as various data identifying the sending sources (e.g., mobile device identifier, such as a media access control (MAC) address, etc.). Such report messages may be from third-party computing devices, such as servers of virus monitoring and/or cyber security services (e.g., Norton, Symantec, McAfee, etc.), or alternatively from subscriber mobile devices. For example, the server may receive failure reports from subscriber mobile device that indicate encountered errors or malware as well as any diagnostic information related to the encountered errors or malware, such as the identity of modules of the software that may have been compromised and/or related to a failure of the software. The operations in optional block 504 may be optional as such report messages may not occur regularly, but instead may be received by the server in response to occurrences of failures or compromises of the software. However, some report messages, such as malware definitions transmitted by third-parties, may be regularly received (or downloaded) by the server.

In block 506, the server may evaluate the security of a plurality of module variations for each of the plurality of modules of the software installed on subscriber mobile devices. In particular, the server may evaluate any received report messages of failures or compromises (e.g., bugs reports, malware notices, etc.) to identify any correlations with the various module variations of the software. In some embodiments, the server may process malware definitions to identify techniques (e.g., control paths, security holes, etc.) utilized by malware and compare such identified techniques to the module variations to determine whether any of the module variations are at risk of compromise from the malware. For example, the server may identify that a particular virus utilizes a certain functionality of software, such as a port, operational loop, plug-in, programming language, authentication logic, etc., and analyze module variations of the software to determine whether they are structured to include or otherwise use that certain functionality. In some embodiments, the server may calculate a likelihood that malware has compromised a particular module variation based on a number of received reports from subscriber mobile devices indicating errors or failures have occurred relating to the module variation (e.g., the report messages include the module variation identifier, the report messages are from subscriber mobile devices known by the server to have implemented the same module variation, etc.).

In determination block 508, the server may determine whether any of the plurality of module variations for any of the plurality of modules of the software are compromised (or potentially compromised) based on the evaluations of block 506. Based on the evaluations of block 506, module variations may be identified as compromised due to many reasons, such as being flawed (e.g., including known bugs, etc.), outdated (e.g., outside of a predefined freshness threshold set by developers, manufacturers, etc.), and/or known to have been exploited by malware. For example, the server may determine a first module variation is compromised based on receiving a report message from a subscriber mobile device indicating the identifier matching the module variation has failed. As another example, the server may determine a second module variation is compromised based on a calculation of the likelihood that a known malware implementation utilizes a functionality of the second module variation. In response to determining that no module variations of the software have been compromised (i.e., determination block 508="No"), the server may continue with the operations in optional block 504 for receiving subsequent report messages.

In response to determining that a module variation of the software has been compromised (i.e., determination block 508="Yes"), the server may transmit, to subscriber mobile devices, a notification message indicating the identifier(s) of compromised module variation(s) of the plurality of modules of the software in block 510. As described above with reference to FIGS. 4A-4B, such notifications may include the identifiers of the compromised module variations and/or other information that may cause the subscriber mobile devices to invalidate, make unavailable, or otherwise discontinue the use of the compromised module variations. For example, the notification may include a code or command that may cause a recipient subscriber mobile device to set a flag associated with the module variation to be set to "inactive" on "unavailable". In this manner, the server may dynamically and efficiently distribute patch-like information to subscriber mobile devices that improves their software diversity without requiring actual software modules, codebases, or other resource intensive transfers to occur.

In various embodiments, the server may additionally be configured to transmit conventional software updates, fixes, and other useful data to subscriber mobile devices. To accomplish this, in optional block 512, the server may obtain software updates for all modules of the software. For example, via an upload from a software developer or a file transfer from another computing device or server, the server may receive a new version of the source code or compiled executable of the software and its various modules. In order to preserve the improvements to the software from the identified compromises to module variations, in optional block 514, the server may transmit update messages that include software updates for all uncompromised module variations of the modules of the software. In other words, the server may track the identifiers of compromised module variations and make remove any related updates from subsequent patches so that subscriber mobile devices may not expend unnecessary resources receiving and processing module variations that may never be selected for use at runtime of the software. The server may continue with the operations for receiving additional report messages in optional block 504.

Figure 6:
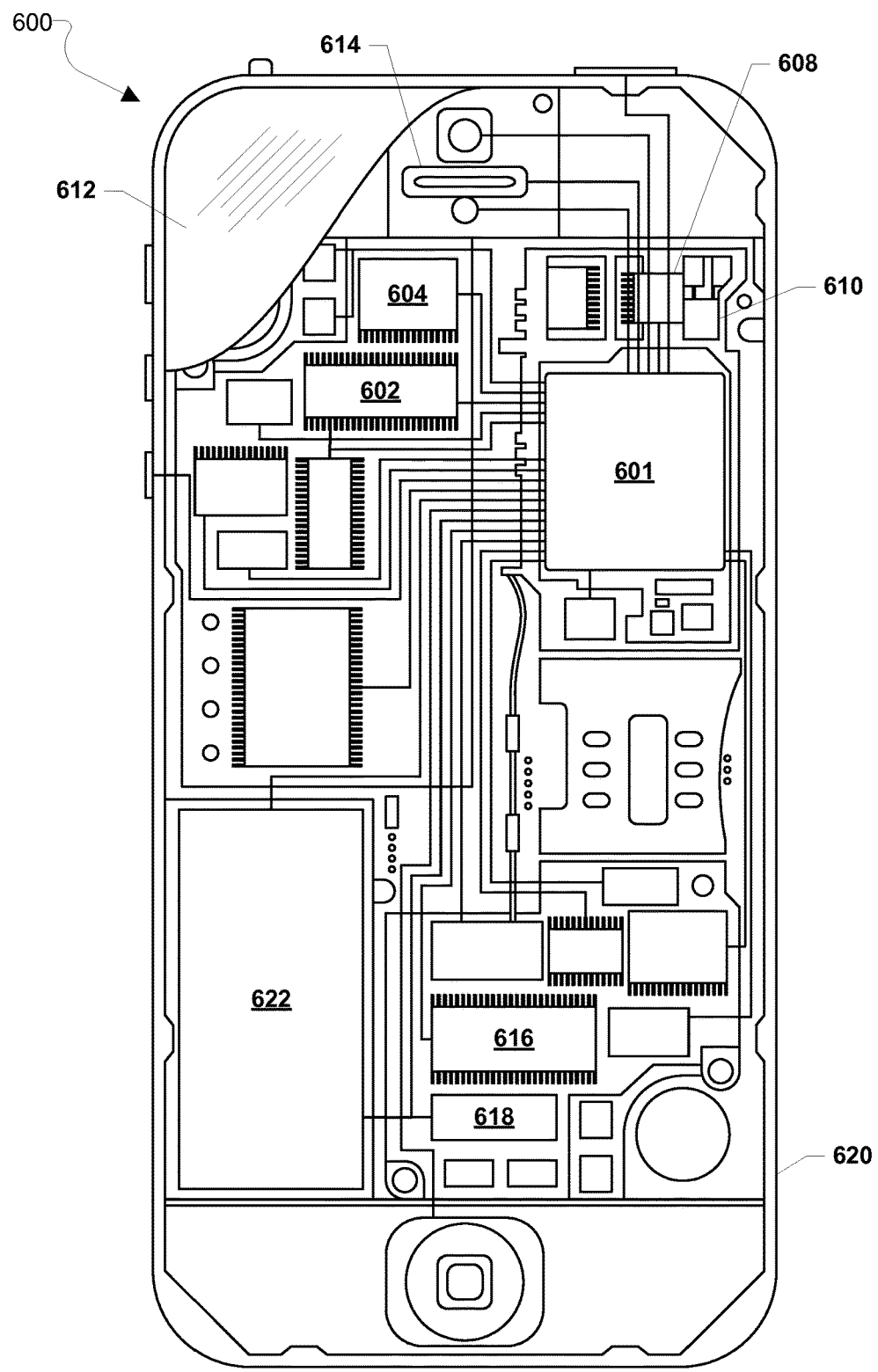
FIG. 6 is a component block diagram of a mobile computing device suitable for use in an embodiment.

Various forms of mobile computing devices may be used to implement the various embodiments. Such mobile computing devices typically include the components illustrated in FIG. 6 which illustrates an example smartphone-type mobile computing device 600. In various embodiments, the mobile computing device 600 may include a processor 601 coupled to a touch screen controller 604 and an internal memory 602. The processor 601 may be one or more multicore ICs designated for general or specific processing tasks. The internal memory 602 may be volatile or non-volatile memory, and may also be secure and/or encrypted memory, or unsecure and/or unencrypted memory, or any combination thereof. The touch screen controller 604 and the processor 601 may also be coupled to a touch screen panel 612, such as a resistive-sensing touch screen, capacitive-sensing touch screen, infrared sensing touch screen, etc. The mobile computing device 600 may have one or more radio signal transceivers 608 (e.g., Peanut®, Bluetooth®, Zigbee®, Wi-Fi, RF radio) and antennae 610, for sending and receiving, coupled to each other and/or to the processor 601. The transceivers 608 and antennae 610 may be used with the above-mentioned circuitry to implement the various wireless transmission protocol stacks and interfaces. The mobile computing device 600 may include a cellular network wireless modem chip 616 that enables communication via a cellular network and is coupled to the processor. The mobile computing device 600 may include a peripheral device connection interface 618 coupled to the processor 601. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The mobile computing device 600 may also include speakers 614 for providing audio outputs. The mobile computing device 600 may also include a housing 620, constructed of a plastic, metal, or a combination of materials, for containing all or some of the components discussed herein. The mobile computing device 600 may include a power source 622 coupled to the processor 601, such as a disposable or rechargeable battery. The rechargeable battery may also be coupled to the peripheral device connection port to receive a charging current from a source external to the mobile computing device 600.

Figure 7:
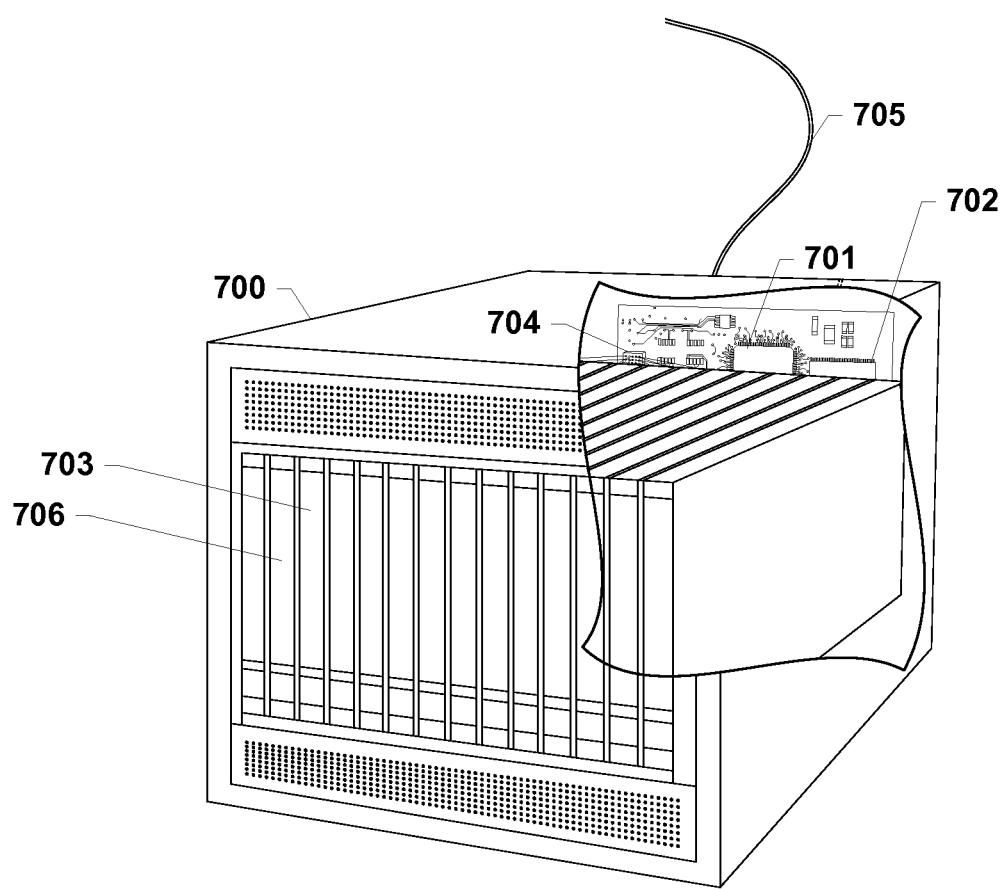
FIG. 7 is a component block diagram of a server computing device suitable for use in an embodiment.

The various embodiments may be implemented on any of a variety of commercially available server devices, such as the server computing device 700 illustrated in FIG. 7. Such a server computing device 700 may typically include a processor 701 coupled to volatile memory 702 and a large capacity nonvolatile memory, such as a disk drive 703. The server computing device 700 may also include a floppy disc drive, compact disc (CD) or DVD disc drive 706 coupled to the processor 701. The server computing device 700 may also include network access ports 704 coupled to the processor 701 for establishing data connections with a network 705, such as a local area network coupled to other system computers and servers.

The processors 601 and 701 may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory 602 and 702 before they are accessed and loaded into the processors 601 and 701. The processors 601 and 701 may include internal memory sufficient to store the application software instructions. In many devices the internal memory may be a volatile or nonvolatile memory, such as flash memory, or a mixture of both. For the purposes of this description, a general reference to memory refers to memory accessible by the processors 601 and 701 including internal memory or removable memory plugged into the various devices and memory within the processors 601 and 701.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or a plurality of microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored on or transmitted over as instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for dynamic patching of diversity-based software executing on a mobile device, comprising:
    obtaining, by a transceiver of the mobile device, a notification comprising one or more identifiers identifying module variations stored on the mobile device for software executing on the mobile device;
    removing, by a processor of the mobile device, a module variation identified by the one or more identifiers from a list of available module variations for the module in response to obtaining the notification, wherein one of the list of available module variations is activated by the processor at runtime of the software;
    selecting, by the processor, a first identifier associated with a particular module variation of the available module variations from the list of available module variations for the module at runtime of the software, wherein the first identifier is selected based on at least one of a number of times the particular module variation has been used by the software, the complexity of the particular module variation, the similarity of the particular module variation to compromised module variations, or the similarity of the particular module variation to already selected module variations of other modules of the software;

interrupting, by the processor, execution of the selected particular module variation in response to determining the selected particular module variation is already executing on the processor of the mobile device when the notification is obtained;

activating, by the processor, the particular module variation associated with the selected first identifier to be used as the module during runtime of the software by:

generating, by the processor, the particular module variation at runtime of the software; and loading the generated module variation into the software executing on the computing device;

determining, by the processor, whether the activated particular module variation encountered errors at runtime; and transmitting, by the transceiver, a report comprising the first identifier of the activated particular module variation in response to determining that the activated particular module variation encountered errors at runtime.

2. The method of claim 1, wherein the notification is received by the mobile device from a remote server.

3. The method of claim 2, wherein the notification does not include data or executable code capable of being used as one of the available module variations by the software.

4. The method of claim 1, wherein the removed module variation is one of flawed, outdated, and identified as exploited by malware.

5. The method of claim 1, wherein the activated particular module is one of a plurality of modules utilized by the software at runtime, the method further comprising:

selecting, by the processor, identifiers from lists of available module variations associated with other modules in the plurality of modules at runtime of the software; and activating, by the processor, available module variations for the other modules in the plurality of modules associated with the selected identifiers to be used as the other modules during runtime of the software.

6. The method of claim 1, wherein the notification is received by the mobile device during runtime of the software.

7. A computing device for dynamic patching of diversity-based software executing on a mobile device, comprising:

a processor executing processor-executable instructions to perform operations comprising:

obtaining a notification comprising one or more identifiers identifying module variations stored on a mobile device for software to executing on the computing device;

removing a module variation identified by the one or more identifiers from a list of available module variations for the module in response to obtaining the notification, wherein one of the list of available module variations is activated by the processor at runtime of the software;

selecting a first identifier associated with a particular module variation of the available module variations from the list of available module variations for the module at runtime of the software, wherein the first identifier is selected based on at least one of a number of times the particular module variation has been used by the software, the complexity of the particular module variation, the similarity of the particular module variation to compromised module variations, or the similarity of the particular module variation to already selected module variations of other modules of the software;

interrupting execution of the selected particular module variation in response to determining the selected particular module variation is already executing on the processor of the mobile device when the notification is obtained;

activating the particular module variation associated with the selected first identifier to be used as the module during runtime of the software by:

generating the particular module variation at runtime of the software; and loading the generated module variation into the software executing on the computing device;

determining whether the activated particular module variation encountered errors at runtime; and transmitting a report comprising the first identifier of the activated particular module variation in response to determining that the activated particular module variation encountered errors at runtime.

8. The computing device of claim 7, wherein the notification is received by the computing device from a remote server.

9. The computing device of claim 8, wherein the notification does not include data or executable code capable of being used as one of the available module variation by the software.

10. The computing device of claim 7, wherein the removed module variation is one of flawed, outdated, and identified as exploited by malware.

11. The computing device of claim 7, wherein the activated particular module is one of a plurality of modules utilized by the software at runtime, and the processor is configured with processor-executable instructions to perform operations further comprising:

selecting identifiers from lists of available module variations associated with other modules in the plurality of modules at runtime of the software; and activating available module variations for the other modules in the plurality of modules associated with the selected identifiers to be used as the other modules during runtime of the software.

12. The computing device of claim 7, wherein the notification is received by the computing device during runtime of the software.

13. A computing device for dynamic patching of diversity-based software executing on a mobile device, comprising:

means for obtaining a notification comprising one or more identifiers identifying module variations stored on a mobile device for software executing on the computing device;

means for removing a module variation identified by the one or more identifiers from a list of available module variations for the module in response to obtaining the notification, wherein one of the list of available module variations is activated by the means for removing the module variation at runtime of the software;

means for selecting a first identifier associated with a particular module variation of the available module variations from the list of available module variations for the module at runtime of the software, wherein the first identifier is selected based on at least one of a number of times the particular module variation has been used by the software, the complexity of the particular module variation, the similarity of the particular module variation to compromised module variations, or the similarity of the particular module variation to already selected module variations of other modules of the software;

means for interrupting execution of the selected particular module variation in response to determining the selected particular module variation is already executing on the means for selecting the first identifier when the notification is obtained by the means for obtaining the notification;

means for activating the particular module variation associated with the selected first identifier to be used as the module during runtime of the software by:

means for generating the particular module variation at runtime of the software; and means for loading the generated module variation into the software executing on the computing device;

means for determining whether the activated particular module variation encountered errors at runtime; and means for transmitting a report comprising the first identifier of the activated particular module variation in response to determining that the activated particular module variation encountered errors at runtime.

14. The computing device of claim 13, wherein the notification is received by the computing device from a remote server.

15. The computing device of claim 14, wherein the notification does not include data or executable code capable of being used as one of the available module variations by the software.

16. The computing device of claim 13, wherein the removed module variation is one of flawed, outdated, and identified as exploited by malware.

17. The computing device of claim 13, wherein the activated particular module is one of a plurality of modules utilized by the software at runtime, the computing device further comprising:

means for selecting identifiers from lists of available module variations associated with other modules in the plurality of modules at runtime of the software; and means for activating available module variations for the other modules in the plurality of modules associated with the selected identifiers to be used as the other modules during runtime of the software.

18. The computing device of claim 13, wherein the notification is received by the computing device during runtime of the software.

19. A non-transitory processor-readable storage medium having stored thereon processor-executable instructions configured to cause a processor of a computing device to perform operations for dynamic patching of diversity-based software executing on a mobile device, comprising:

obtaining a notification comprising one or more identifiers identifying module variations stored on a mobile device for software executing on the computing device;

removing a module variation identified by the one or more identifiers from a list of available module variations for the module in response to obtaining the notification, wherein one of the list of available module variations is activated by the processor at runtime of the software;

selecting a first identifier associated with a particular module variation of the available module variations from the list of available module variations for the module at runtime of the software, wherein the first identifier is selected based on at least one of a number of times the particular module variation has been used by the software, the complexity of the particular module variation, the similarity of the particular module variation to compromised module variations, or the similarity of the particular module variation to already selected module variations of other modules of the software;

interrupting execution of the selected particular module variation in response to determining the selected particular module variation is already executing on the processor of the mobile device when the notification is obtained;

activating the particular module variation associated with the selected first identifier to be used as the module during runtime of the software by:

generating the particular module variation at runtime of the software; and loading the generated module variation into the software executing on the computing device;

determining whether the activated particular module variation encountered errors at runtime; and transmitting a report comprising the first identifier of the activated particular module variation in response to determining that the activated particular module variation encountered errors at runtime.

* * * * *